United States Patent [19]
Kusano et al.

[11] 3,791,103
[45] Feb. 12, 1974

[54] METHOD OF TREATING WASTE GAS ARISING FROM INDUSTRIAL FACILITY

[75] Inventors: Kazuto Kusano; Kenji Miyata, both of Tokyo, Japan

[73] Assignee: Japan Gasoline Co., Ltd., Tokyo, Japan

[22] Filed: June 30, 1972

[21] Appl. No.: 268,158

[30] Foreign Application Priority Data
July 10, 1971  Japan.............................. 46-51203

[52] U.S. Cl. ......................................... 55/73, 55/74
[51] Int. Cl. ............................................ B01d 53/04
[58] Field of Search.......................... 55/73, 84, 257

[56] References Cited
UNITED STATES PATENTS
3,473,297  10/1969  Tamura et al. .......................... 55/73
3,382,649  5/1968  Richmond................................ 55/84
3,085,379  4/1963  Kiyonaga et al. ....................... 55/58

*Primary Examiner*—Charles N. Hart
*Attorney, Agent, or Firm*—Woodhams, Blanchard and Flynn

[57]  ABSTRACT

A method of treating waste gas containing harmful components arising from an industrial facility by the use of a waste-gas treating equipment, which comprises the provision of an open bypass duct leading directly from the outlet for waste gas of the industrial facility to the exhaust system and a duct equipped with a blower and a waste gas treating equipment which branches off said bypass duct to lead to the exhaust system, said blower working to pass at least the whole quantity of the waste gas generated in the industrial facility through said waste gas treating equipment.

6 Claims, 2 Drawing Figures

PRIOR ART FIG. 1
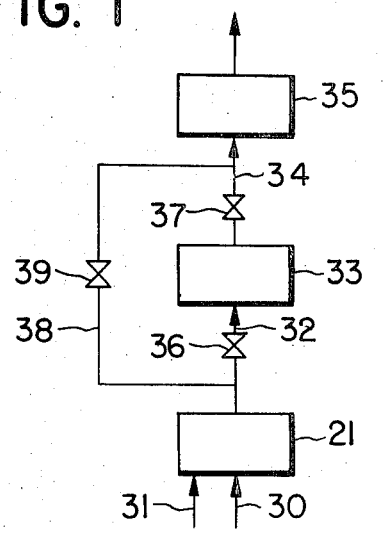
FIG. 2
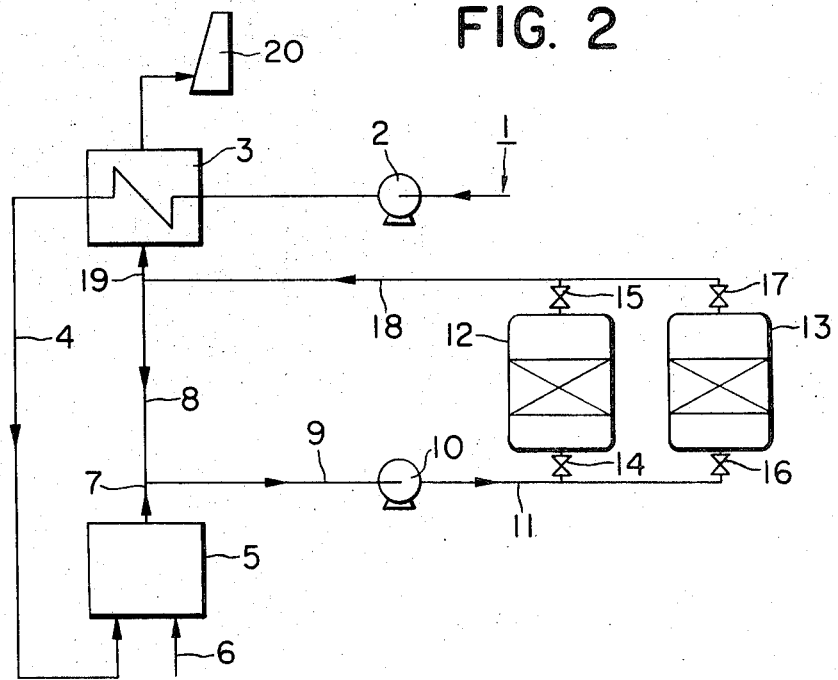

METHOD OF TREATING WASTE GAS ARISING FROM INDUSTRIAL FACILITY

BACKGROUND OF THE INVENTION a. Field of the Invention

The present invention relates to a method of treating waste gas containing harmful components arising from industrial facilities such as combustion furnace and the like, which is intended to convert said gas into a harmless gas by eliminating the harmful components thereof.

b. Description of the Prior Art

According to the conventional method of treating the waste gas arising from industrial facilities, for instance, the combustion furnace, the waste gas generated in the combustion furnace 21 being fed with heavy fuel oil 30 and air 31 as shown in FIG. 1 is introduced into the waste gas treating equipment 33 through the duct 32, and the gas made to be free of harmful components therein is released through the ducts 34 and the exhaust system 35 into the atmosphere. On this occasion, when the cycle of reaction, regeneration, etc. for the waste gas treating equipment is performed through switchover operation, the combustion furnace 31 will be influenced by the fluctuations of pressure, flow and others. And, in case the waste gas treating equipment 33 gets out of order or shows a decrease in treating efficiency, the passage of waste gas is changed by closing the valves 36 and 37 while opening the valve 39 in of the bypass duct 38 branching off the duct 32 and connected to the duct 34. However, at the time of thus shifting the passage of waste gas, the flow of waste gas gives rise to tremendous fluctuations of pressure, causing complicated external disturbances to the combustion furnace and correlated equipment to render it extremely difficult to insure stable operation of these facilities. Under such circumstances, it has been required to provide expensive automatic flow regulator or pressure regulator in order to secure a stable operation throughout its running. This measure, however, not only increases the financial burden but also falls short of overcoming those external disturbances which are quite undersirable for stable operation of the combustion furnace. It goes without saying that, also at the time of resumption of the operation of the waste gas treating equipment dealing with the waste gas arising from other various industrial facilities, the same fluctuations of pressure and flow as set forth above also will occur in the industrial facility constituting the waste-gas generating source.

SUMMARY OF THE INVENTION

The present invention relates to a method of treating the waste gas containing harmful components arising from industrial facilities in order to eliminate said harmful components through treatment by the use of a waste gas treating equipment, which comprises the provision of an open bypass duct leading directly from the outlet for waste gas of the industrial facility to the exhaust system and a duct branching off from said bypass duct to lead to the exhaust system and equipped with a blower and a waste gas treating equipment, said blower working to pass at least the whole quantity of the waste gas generated in the industrial facility through said waste gas treating equipment.

BRIEF DESCRIPTION OF THE DRAWINGS

FIG. 1 is a diagrammatic illustration of a prior art system.

FIG. 2 is a diagrammatic illustration of a system according to the present invention.

DESCRIPTION OF THE PREFERRED EMBODIMENTS

The term "industrial facility" employed in the present description means all industrial combustion furnaces such as boilers, process heating furnaces and the like which emit waste gas containing harmful components as a result of combustion of various fuels, e.g., heavy fuel oil, etc. which gas will have undesirable effect from the viewpoint of environmental pollution if discharged into the air as it is, or production facilities and the like employed in various plants manufacturing synthetic resin, synthetic fiber, etc. which also emit harmful gases.

The term "harmful waste gas" means the gas emitted from combustion furnaces employing heavy fuel oil and the like as the fuel, or those waste gases which are emitted from various industrial facilities such as reactors, roasting furnaces, drying equipment, melting furnaces and the like. The harmful components vary with the kind of the waste gas: as the component which will have undesirable effect from the viewpoint of environmental pollution if discharged into the air as it is, $SO_2$ is typical. And, in addition, there are $H_2S$, $NO_x$, $CS_2$, varieties of gaseous solvents, dust, mist, bad-smelling gas and the like.

According to the present invention, the quantity of the waste gas to be passed through the waste gas treating equipment by the blower is generally required to be slightly more than the quantity of the waste gas to be generated in the industrial facility concerned. For this purpose, the whole quantity of the waste gas arising from the industrial facility and a small portion of the post-treatment gas flowing backwardly through the open bypass duct leading directly to the exhaust system are made to flow together to be sent into the waste gas treating device by means of the blower. Consequently, the entirety of the waste gas emitted from the industrial facility is supposed to pass through the waste gas treating device, and untreated harmful waste gas is never discharged into the air from the exhaust system directly through the open bypass duct leading to the exhaust system. This notwithstanding, it is also possible to send a part of the waste gas into the exhaust system through the open bypass duct as occasion demands.

The open bypass duct herein means a duct in substantially open state. Accordingly, even in the case of a bypass duct provided with a valve or damper, as long as it is used as a duct in open state, it is regarded as an open bypass duct.

The exhaust system is provided with a means to discharge the treated waste gas into the air, such as a chimney and the like. The provision of white-smoke elimination device or other additional treating devices for further treatment of the treated waste gas is also conceivable, and therefore, the structure of this system is not specified herein.

The blower to be employed can be a conventional blower, fan and, in addition, compressor and it may be located either upstream or downstream of the treating device within the branched duct from the open bypass duct. As the waste gas treating device, dry or wet $SO_2$ eliminator, dust catcher, solvent adsorption reclaimer, deodorizer and the like will do, and it may be appropriately chosen depending on the harmful components contained in the waste gas to be treated.

Next, a detailed explanation of the present invention will be given in the following in reference to an example of its application to the treatment of the waste gas arising from a boiler fired by a heavy fuel oil. FIG. 2 of the appended drawings is a diagrammatic representation of the waste-gas treatment system according to the present invention, wherein the boiler is provided with a dry-type flue gas desulfurizer requiring switchover operation as the waste gas treating equipment.

Air taken in through the inlet 1 is sent into the boiler 5 through the preheater 3 and the duct 4 by means of the air-blower 2 while heavy fuel oil is fed into the boiler 5 through the inlet 6, whereby combustion is effected. The waste gas arising from the combustion of heavy oil and containing $SO_2$ as the principal harmful component is discharged through the waste-gas outlet duct 7. The duct 7 forks into the open bypass duct 8 leading directly to the duct 19 and the duct 9 leading to the exhaust system via the flue gas desulfurizer 12, 13. The blower 10 provided in the duct 9 is so devised as to send slightly more waste gas to the flue gas desulfurizer than that discharged through the outlet duct 7 at the time of normal running, and therefore, the entirety of the waste gas is fed to said desulfurizing device 12, 13 through the ducts 9 and 11.

The desulfurizing device is the two-column shift type so that a pair of desulfurizers are operated alternately, that is, while the treatment of the waste gas is being performed by the desulfurizer 12 provided with the transfer valves 14, 15, the regeneration processing is carried out by the desulfurizer 13 provided with the transfer valves 16, 17, and vice versa. The post-treatment waste gas deprived of harmful components such as $SO_2$, etc. is sent through the duct 18 and the duct 19 to be discharged into the air through the chimney 20 after being subjected to heat exchange in the air preheater 3. On this occasion, the greater part of the treated waste gas is supposed to be discharged into the air through the duct 19, but a small part thereof enters the open bypass duct 8 to join the untreated waste gas flowing through the duct 7 and said small part of the treated waste gas re-enters the desulfurizer. This arrangement for sending more waste gas to the desulfurizer than that discharged through the outlet duct 7 while the quantity and direction of the gas flowing through the open bypass duct 8 are automatically determined by the mutual relation of the quantity of the air and the quantity of the waste gas made to flow by virtue of the air blower 2 and the blower 10, is preferable for the purpose of preventing a part of the non-desulfurized waste gas from being discharged into the atmosphere through the open bypass duct 8.

As will be understood from the above example, according to the present invention, the combustion furnace is absolutely free from the influence of any shift in the running of the harmful component treating device. Therefore, stable operation of the combustion furnace can be secured regardless of the condition for operation of the treating device, resulting in economic and efficient use thereof. Besides, even when there is any alteration of the condition for operation on the part of the combustion furnace, it is possible to continue a stable operation on the part of the waste gas treating device. It goes without saying that the same effect of the present invention as in the case of the combustion furnace exemplified above can be expected when applied to other industrial facilities.

Moreover, according to the conventional method not employing the open bypass duct, the use of a waste gas treating device requiring switchover operation causes external disturbances to the combustion furnace and other devices related thereto due to said switchover operation, but the present method is free of such troubles. Further, the present method can dispense with the valve, pressure or flow regulator and the like which have been considered indispensable in the prior art, thereby decreasing the construction expenses as a whole. Besides, according to the present method, addition of a new waste gas treating device or arrangement of plural units of said device in series can be performed without installing the valve in the bypass duct but by merely taking out the line, and accordingly, it is scarcely restricted by the existing arrangement of facilities.

What is claimed is:

1. In a method for treating waste gas containing harmful components emitted by an industrial facility, in which the waste gas is flowed through waste gas treating equipment to remove said harmful components and then the treated gas is discharged, the improvement which comprises, during the operation of said industrial facility, continuously flowing a portion of said treated gas leaving said waste gas treating equipment through an open by-pass duct back to the waste gas outlet of said industrial facility and continuously impelling the entirety of the waste gas emitted from said industrial facility together with said portion of said treated gas through said waste gas treating equipment.

2. A method of treating waste gas according to claim 1, wherein said industrial facility generating a is a combustion furnace, reactor, drying equipment, or melting furnace.

3. A method of treating waste gas according to claim 1, wherein the waste gas treating equipment is a wet $SO_2$ eliminator, dust catcher, solvent adsorption reclaimer or deodorizer.

4. A method according to claim 1, in which the entirety of the waste gas together with said portion of said treated gas are impelled by a gas-moving device through said waste gas treating equipment, said gas-moving device having a volumetric capacity larger than the volume of waste gas generated in said industrial facility.

5. A method of treating waste gas according to claim 1, wherein the remainder of the treated gas is flowed through an afterburner, white-smoke eliminator or post-treating apparatus and then is discharged.

6. A method of treating waste gas according to claim 1, wherein the waste gas contains harmful components composed of a member or members selected from the group consisting of $SO_2$, $H_2S$, $NO_x$, $CS_2$ and gaseous solvent.

* * * * *